US012792359B2

(12) United States Patent
Haskell et al.

(10) Patent No.: US 12,792,359 B2
(45) Date of Patent: Nov. 10, 2026

(54) PLATFORM AGNOSTIC BOOT SYSTEM

(71) Applicant: HEWLETT PACKARD ENTERPRISE DEVELOPMENT LP, Spring, TX (US)

(72) Inventors: Darrell Robert Haskell, Chromo, CO (US); Walton Aaron Rosen, Houston, TX (US); David Francis Heinrich, Tomball, TX (US); Andrew Cid Cartes, Cypress, TX (US); Theodore F. Emerson, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 46 days.

(21) Appl. No.: 18/806,993

(22) Filed: Aug. 16, 2024

(65) Prior Publication Data

US 2026/0050446 A1 Feb. 19, 2026

(51) Int. Cl.
*G06F 9/4401* (2018.01)
*G06F 11/07* (2006.01)

(52) U.S. Cl.
CPC ........ *G06F 9/4401* (2013.01); *G06F 11/0766* (2013.01)

(58) Field of Classification Search
None
See application file for complete search history.

(56) References Cited

U.S. PATENT DOCUMENTS

2016/0363978 A1* 12/2016 Gonzales .............. G06F 9/4401
2018/0226051 A1* 8/2018 Swaminathan ........ G09G 5/006
2021/0133081 A1* 5/2021 Kelly .................... G06F 11/301
2023/0161658 A1* 5/2023 Tung ...................... G06F 11/141
714/48
2023/0195568 A1* 6/2023 Hong .................... G06F 11/073
714/764
2024/0289202 A1* 8/2024 Gupta ................. G06F 13/4282

* cited by examiner

*Primary Examiner* — Kim Huynh
(74) *Attorney, Agent, or Firm* — Jones Burke, PLLC

(57) ABSTRACT

A system and method, the method comprising initializing a universal asynchronous receiver-transmitter (UART) interface connected to a baseboard management controller (BMC) of the computing system, in response to the UART interface being initialized, receiving at the BMC at least one communication code from a processor of the computing system via the UART interface, and executing, by the BMC, a functionality task associated with the communication code. The system and method may include initializing the UART prior to training a PCIe bus. Functionality tasks may include event and error logging and displaying video images.

20 Claims, 5 Drawing Sheets

PLATFORM AGNOSTIC BOOT SYSTEM

INTRODUCTION

Most computing system architectures, such as personal computers and servers, start the booting process by initializing System on chip (SOC) components, often starting with the CPU. Once initialized, the CPU uses hardware initialization firmware, such as Basic Input/Output System (BIOS) or Unified Extensible Firmware Interface (UEFI) to continue initializing additional hardware and software components of the system and, ultimately, to load the operating system. The initialization of components may include the training of a PCIe bus, and this usually occurs at a relatively late stage in the booting process. The PCIe bus is generally what is used by the CPU to communicate with hardware outside of the SOC, such as a video controller or Baseboard Management Controller (BMC).

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

Figure 1:
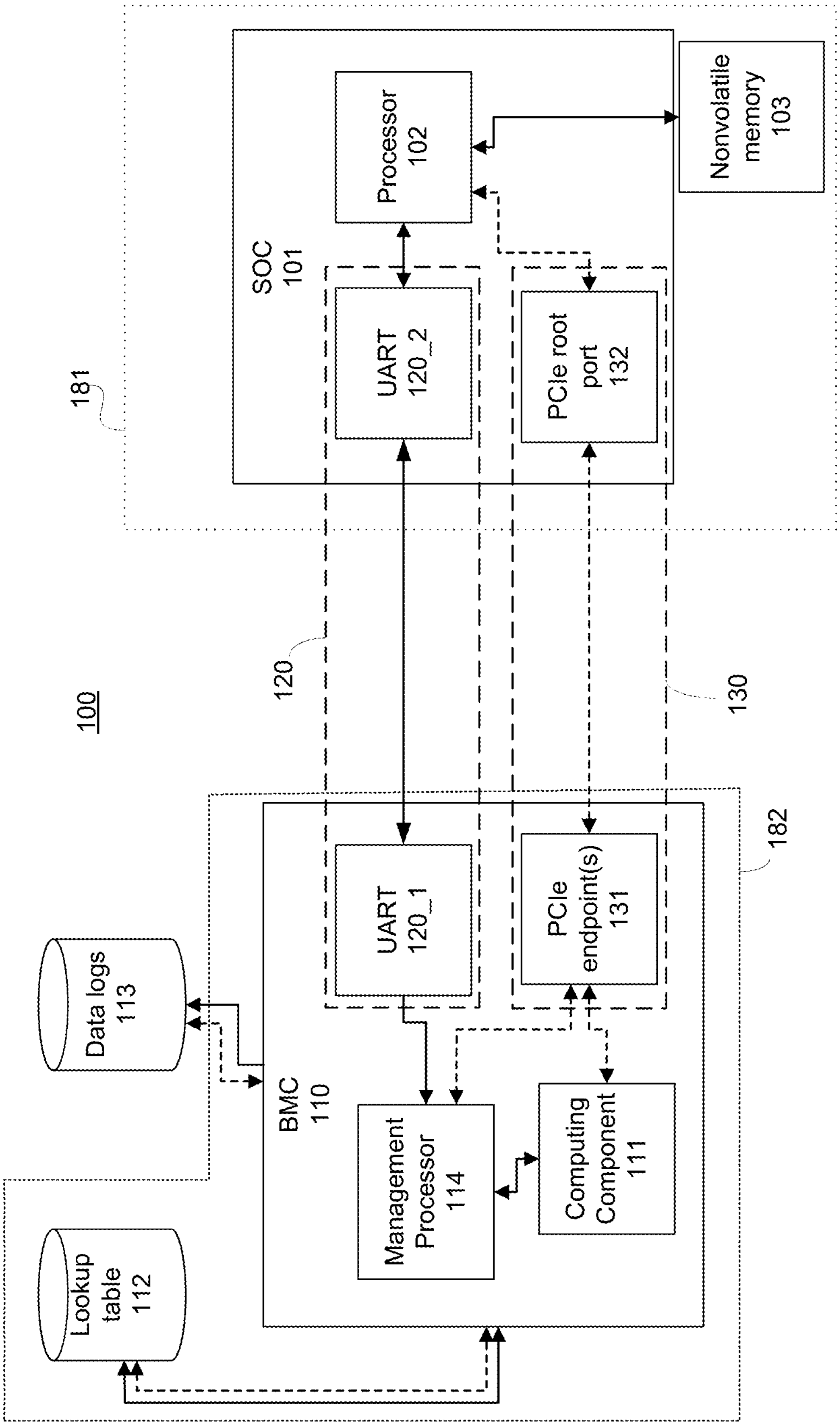
FIG. 1 is a block diagram of an example computing system in accordance with some implementations of the present disclosure, showing offloaded functions and a hand-off operation.

The drawings are included to provide a further understanding of the present disclosure and are incorporated in and constitute a part of this specification. The drawings illustrate one or more examples of the present teachings and together with the description explain certain principles and operations. In some occasions, details that are not necessary for an understanding of an instance of this disclosure or that render other details difficult to perceive may have been omitted.

DETAILED DESCRIPTION

Because the PCIe bus is trained at a later stage of the boot process, functions which depend on communications from the CPU via the PCIe bus are generally not available until that later stage of boot. In other words, information generated by the CPU during the booting process is only communicable at that later stage of boot. For example, a function of video output may depend on the CPU communicating image information to the video controller via the PCIe bus, and thus video output may not be available until a later stage. As another example, a function of logging errors may depend on the CPU communicating error messages via the PCIe bus, and thus such error logging may not be available until the later stage. However, it may be desired to have access to some of these functions and/or CPU generated information at a much earlier stage in the boot processes than has traditionally been possible, even before the CPU is fully initialized. For example, it may be desirable to have a video output displaying an initial logo or information, such as status code or error messages, generated by the BIOS/UEFI during a Power-on Self-test (POST) operation.

One solution for providing access to certain functions earlier in the boot sequence, while the CPU is initializing and configuring higher priority components, is to offload some of the functions from the CPU to the BMC. For example, the CPU may offload to the BMC the operation of displaying boot information. However, while offloading functions to the BMC may allow for those functions to be provided at an earlier timing than would otherwise be possible, additional advancements in the timing at which the functions are provided may be desired. In particular, communication between the SOC components and the BMC may be required in order for the BMC to perform the offloaded functions, but such communication between BMC and SOC components have generally not been possible until later stages in the boot process. Such communications between the BMC and SOC generally go through the PCIe bus, and thus they generally can occur only after training of the PCIe bus, which occurs relatively late in the boot process. Thus, the completion of PCIe bus training has generally been the earliest timing at which certain functions offloaded to the BMC can be available, and this timing may be later in the boot process than may be desired in some circumstances.

While training the PCIe bus at an earlier stage of the booting process could in theory allow for earlier CPU communications, and thus earlier access to the functionalities that depend upon it, this is generally not practical. Changing the timing at which the PCIe bus is initialized introduces its own set of complexities, and generally must be specific for each platform (i.e., new changes may have to be made for each new SoC generation and for each SoC vendor). In some cases, certain SoC vendors may not allow access to their pre-boot source code nor otherwise allow custom modifications, thus making the early training of the PCIe bus unfeasible for anyone other than the platform (i.e., SoC) vendor. The complexity and costs associated with early training of the PCIe bus often makes this solution not desirable, and in some cases not possible.

To address the above-mentioned challenges, this disclosure provides a platform agnostic solution that utilizes a simple communication interface, such as a Universal Asynchronous Receiver/Transmitter (UART) hardware and a new communication protocol for establishing communication between the BMC and SOC components, at the earlier stages of the booting process. The UART can be initialized very early in the booting process (in some cases, with a BMC's always-on feature, it can even occur before the power button is pressed), and thus it may be possible to establish communications between the BMC and CPU very early in the boot process by communicating through the UART. These early communications between CPU and BMC may allow the BMC to perform certain functionalities very early in the boot process, which otherwise would have to wait for the PCIe bus to be trained, such as displaying information, error logging, etc. The UART is also widely available in the vast majority of systems, thus making it relatively easy to provide early CPU/BMC communication capabilities in most systems without the need for platform specific configuration, since the UART is already present in those platforms.

One example of the early functionality that the UART may facilitate is early video display functionality. For example, the BMC can receive boot information from the CPU indicating a current boot status, and the BMC may generate video data (e.g., text, graphics, etc.) which conveys the current boot status and send that video data to the video controller to be displayed. This implementation may provide the video display of information (e.g., boot information, logos, progress bars, error messages, etc.) that begins near the press of a power button at a speed that is perceived by the human eye as occurring simultaneously with the press of the power button. In contrast, in other approaches, such video display may be substantially delayed, in some cases for minutes, which can deprive the user of useful information and leave the user in doubt as to what the system is doing and whether it is correctly booting.

In addition, as UART interfaces allow for bilateral communication, the BMC may also perform a handshake operation and status queries with the BIOS/UEFI. As noted above, the communications between the BMC and SOC via the UART may be enabled, in part, through the use of a new communication protocol defined for this purpose. The communication protocol may include a simple ASCII based instruction set that provides a lookup of the BIOS or UEFI image, the boot information to be displayed by the BMC can be modified without affecting the ability to change the BIOS or UEFI functionality. Once the normal communication interface between the BMC and CPU is ready for use (e.g., the PCIe bus is trained), the BMC hands off the boot display functionality back to the CPU and the system may switch over to using that interface (e.g. the PCI bus) for the communications thereafter.

These and other examples will be described in greater detail below in relation to FIGS. 1-5.

FIG. 1 is a block diagram of a computing system 100 comprising a baseboard management controller (BMC), in accordance with implementations of this disclosure. System 100 may include a server, smart device, personal computer, or any device with computing resources such as a processor. System 100 may include an auxiliary communication interface. System 100 is described herein as including a UART interface 120. However, it should be noted that other auxiliary interfaces may be included in system 100 in conjunction with, or instead of, the UART interface 120. System 100 includes a system on chip (SOC) 101, a BMC 110, a computing component 111, a lookup table 112, data logs 113, the UART interface 120 and a PCI bus 130. In instances, system 100 may include a primary board 181 and a control module 182. UART interface 120 includes UART devices 120_1 and 120_2. Primary board 181 includes SOC 101 and PCIe bus 130. Control module 182 includes BMC 110, computing component 111 and UART device 120_1.

The SOC 101 comprises SOC 101 components such as a processor 102 and a UART device 120_2. These SOC 101 components may be integrated together on the same chip, in some examples. As used herein, a "processor" is a component configured for executing instructions, performing calculations, and/or managing tasks. The at least one processor 102 may include a microprocessor, a microcontroller, one or more central processing unit (CPU) cores, an application-specific integrated circuit (ASIC), one or more graphical processing unit (GPU) cores, a field programmable gate array (FPGA), and/or any other hardware device suitable for retrieval and execution of programmed instructions. In some embodiments, processor 102 includes electronic circuitry for performing programmed instructions described in this disclosure. The processor 102 is configured to perform a plurality of tasks within system 100, such as arithmetic logic unit (ALU) operations, control operations, decode instructions, fetch instructions, and the like. In instances, primary board 181 includes a nonvolatile memory communicatively connected to processor 102. In some instances, nonvolatile memory 103 may be communicatively connected to BMC 110. The nonvolatile memory 103 comprises a read-only memory (ROM), or other types of memories used for booting a system, and is configured to store boot instructions. It should be noted that although nonvolatile memory 103 is operationally connected to SOC 101, nonvolatile memory 103 may be included in primary board 181 or control module 182 through a flash procurement interface such as serial peripheral interface (SPI), improved inter-integrated circuit (13C) or enhanced serial peripheral interface (eSPI).

As used herein, a "BMC" is a specialized microcontroller which may be embedded or connected to a primary system board, such as a mother board or host processing module (HPM) board, which operate independently from the SOC 101 components. BMC 110 is communicatively connected to lookup table 112, data logs 113. Although BMC 110 is also communicatively connected to SOC 101 via UART interface 120, their connections will be described as separate connections for ease of description. Once the PCIe bus 130 is trained, the BMC 110 will be communicatively connected to the PCIe bus 130. In some instances, BMC 110 may include, or be communicatively connected to, the nonvolatile memory 103. BMC 110 includes a management processor 114. In instances, BMC 110 may include computing component 111. Computing component 111 may be communicatively connected to management processor 114. In instances, BMC 110 may be communicatively connected to computing component 111 through management processor 114. It should be noted that although the computing component 111 is shown inside the BMC 110, computing component 111 may be located elsewhere in system 100.

In instances, BMC 110 is configured to perform hardware monitoring function, sensor monitoring, power management, remote management of a system, event logging and other functions. In addition, the BMC is also configured to establish communications with the processor 102 early in the boot state via the UART interface 120, as will be described in greater detail below.

The PCIe bus 130 includes a high-speed interface standard for connecting components to a computer's primary board system. In this example, PCIe bus 130 connects processor 102, BMC 110 and computing component 111 to each other. In some instances, PCIe bus 130 may also connect data logs 113 to the system 100 components. In instances, PCIe bus 130 includes a PCIe endpoint 131, connected to the BMC 110, and a PCIe root port 132, connected to the SOC 101. PCIe 130 bus is shown in dashed lines.

The computing component 111 comprises any of a variety of components of the system which may be separate from the SOC and configured to interact with the system, such as peripheral and embedded components. For example, the computing component 111 may be a video controller, a local dataset, a remote database, and the like.

As mentioned above, the UART interface 120 comprises multiple UART devices, such as UART device 120_1 and UART device 120_2, as well as conductive communication pathways (e.g., wires, conductive PCB traces, etc.) communicably connecting the UART devices 120. UART stands for universal asynchronous receiver/transmitter, and refers to both a protocol for communicating serial data and also the transmitter/receiver devices which do that communicating under the protocol. In a given UART interface, to UART devices are communicably connected by two conductive communication pathways (e.g., wires) to enable exchange of data in two directions therebetween. Each UART device may have a transmission pin for transmitting data and a reception pin for receiving data, with the transmission pin of one UART device and the reception pin of the other UART device being connected to the same inter-device communication pathway (wire). UART interfaces, such as the UART interface 120, are generally used by a system to communicate with peripheral devices that use serial data communication, such as keyboards and mice. In addition, in examples disclosed herein, the UART interface 120 is used by the BMC 110 and processor 102 to establish early communications therebetween, as will be described below. In some instances, UART device 120_1 may be a part of BMC 110. In some examples, UART device 120_1 may be a part of control module 182, while UART device 120_2 may be a part of primary board 181. For example, UART device 120_1 may be a part of a DC-SCM that is connected to an HPM through a DC-SCI connector, where the UART device 120_2 is a part of the SOC 101 (which is mounted to the HPM).

Data logs 113 is a data store configured to store log data generated at system 100. In examples, data logs 113 may include local and remote databases, file systems, and the like. Examples of data logs 113 databases may include cloud-based log services, object storage services, time-series databases, SQL databases, NoSQL databases, and the like. Data logs 113 may be included in a non-volatile component located in control module 182 or a component of BMC 110.

Lookup table 112 is a data store that includes codes and instructions used by the BMC 110 to decode communication codes received from the processor 102 via the UART interface. Examples of lookup table 112 may include databases, local and/or remote, file systems, hard disk drives (HDD), solid state storage (SSD), and the like. In some instances, lookup table 112 may be a part of the BMC 110 firmware. In examples, lookup table 112 databases may include embedded databases, cloud-base databases, in-memory datasets, SQL databases, and the like.

FIG. 1 also shows a primary board 181 and a control module 182. As noted above, SOC 101 is mounted to the primary system board 181. In some examples, the BMC 110 is also mounted to, or integrally formed with, the primary system board 181. In some examples, in which the SOC 101 and the BMC 110 are both mounted to the primary board 181, the system board 181 may also be referred to as a motherboard. In other examples, the BMC 110 is part of a removable control module 182 which is removably connected to the primary system board 181. For example, in systems which comply with certain Open Compute Project (OCP) standards, the primary system board 181 might be a so-called Host Processor Module (HPM) as defined by OCP and the control module 182 may be a so-called Datacenter-ready Secure Control Module (DC-SCM) as defined by OCP which removably connects to the HPM.

The primary board and control module 181/182 are shown in dotted line. It should be noted that system 100 may include a plurality of configurations. In some configurations, the primary board 181 may be a modular assembly, such as Host Processor Module (HPM). As used herein, a "modular assembly" is a scalable architecture that utilizes interfaces to connect to a variety of components. For example, primary board 181 in the modular assembly may only include embedded CPU and memory, while all other components are connected to the system board as modules. Although the computing component 111 and UART device 120_2 are shown as part of the primary board 181, it should be noted that computing component 111 could be a modular device connected to the primary board 181, an embedded device as part of the primary system or a component connected to the primary board 181 as a peripheral device.

In examples in which the control module 182 is a DC-SCM, the control module 182 may be communicably connected to the primary system board 181 through a data center-secure control interface (DC-SCI) as defined by OCP. As it would be understood by a person of ordinary skill, the DC-SCI interface can include a UART communication channel through which UART devices on the DC-SCM may communicate with an HPM. Thus, in examples in which the control module 182 is a DC-SCM, portions of the UART interface 120 would also be part of the DC-SCI. In instances, PCIe bus 130 may operationally connect the control module 182 and primary board 181. In instances, PCIe bus 130 may connect BMC 110 to SOC 101.

As mentioned above, system 100 may include primary board 181 and control module 182. However, for ease of description, system 100 will be described in a configuration where the BMC 110, and its respective UART device 120_1, are part of the same system board as SOC 101, computing component 111 and PCIe bus 130. Accordingly, in this example, the BMC 110 is a component of the primary system board. For example, system 100 may include a hardware platform management interface, where the interface includes a dedicated BMC embedded on the motherboard. In an example, BMC 110 may include an Integrated Lights-Out (ILO) baseboard management controller, commercialized by Hewlett-Packard Enterprise, headquartered in Spring TX, USA.

The BMC 110 and processor 102 are configured to use UART interface 120 to communicate with one another in early phases of the boot process. This early communication can enable certain functions, such as video display, error logging, and other functions to be offloaded to the BMC 110 and provided much earlier in the boot process than they otherwise would be. The process of establishing the early communications and the offloading of the functionalities will now be described in greater detail further below. BMC 110 is configured to initialize UART device 120_1. In this example, UART device 120_2 is initialized by processor 102. In other examples, UART 120_2 may also be initialized by the BMC 110. It should be noted that although some examples used herein may be compliant with open compute project (OCP) standards, such as DC-SCI interface and connectors, these are provided only as examples for ease of discussion. As such, system 100 may be implemented according with other standards not discussed in this disclosure. For ease of description, the connections between components during the offloading period (i.e. prior to the handoff operation) are shown in solid arrow lines.

Once the UART interface 120 is initialized, the processor 102 is configured to transmit communication codes being generated during the boot process. As used herein, a "communication code" is a code generated during, and related to, the boot process. Communication code may include error and event codes. In some instances, communication code may also include exceptions thrown during boot. For example, if boot fails and an exception is thrown by the SOC 101. In examples, communication code may include error codes generated during POST operation, by an Active health system (AHS) and the like. The processor 102 transmits the communication code via the UART interface where the communication code is sent from UART device 120_2 to UART device 120_1, which then transmits the communication code to the BMC 110.

Once the communication code is received by the BMC 110, the BMC 110 then will query a lookup table 112 to decode the communication code. The lookup table 112 includes a functionality task associated with the communication code, which includes an action to be performed by the BMC 110 and the error/info message associated with the code. Once the BMC 110 decodes the functionality task associated with the communication code, the BMC 110 proceeds to execute the functionality task.

Executing the functionality task may include transmitting component instructions to computing component 111. As used herein, a "component instruction" is a set of instructions configuring a component to perform one or more actions. For example, BMC 110 may transmit component instructions configuring a video controller to display a message associated with the communication code received.

Executing the functionality task may include transmitting component instructions to data logs 113 database for storing the message associated with the communication code. For example, the BMC 110 may log an error message associated with the communication code in a remote database, where the logs may be accessed during the boot system. It should be noted in this example, the data logs 113 database and the computing component 111 are described as different components for ease of description. In examples, computing component 111 may include data logs 113 database. Both lookup table 112 and data logs 113 may be included in any type of data store. For example, lookup table 112 and data logs 113 may be included in any of a variety of data stores such as, but not limited to, file systems, object storage, local databases, remote databases, solid state hard drives, and the like. Look up and execution of functionality tasks are described in more detail in reference to FIG. 4.

In some instances, the communication code may be an exception. In some instances, BMC 110 may be configured to save the exception to the data logs 113. In some instances, BMC 110 may be configured to send a component instruction to computing component 111 for the exception. For example, if a string exception is sent, the BMC 110 may send a component instruction to computing components 111 to display the exception and/or log the exception into the data logs 113. In this instance, a functionality task related to how to handle exceptions may be included in the BMC 110 firmware. For example, BMC 110 may not need to access the lookup table 112 to get the functionality task for exceptions. In other examples, the lookup table 112 may include instructions for action to be taken based on an exception being thrown. For example, the lookup table 112 may include an instruction for displaying the exception through a video controller.

In some instances, the BMC 110 may be configured to transmit a status request to the processor 102 via the UART interface 120. In instances, BMC 110 may be configured to receive a communication code based on the status request. For example, BMC 110 may send multiple status requests related to a boot event until the event occurs, which causes the processor 102 to send a communication code associated with the event to the BMC 110. In an example, the BMC 110 may be configured to perform a certain action after the event occurs, in which case the BMC 110 pings the processor 102 for that event until it occurs.

In some examples, some functionality tasks may be executed before processor 102 is fully operational. In some instances, an embedded controller connected to the nonvolatile memory 103 may transmit early BIOS/EUFI messages (i.e. before the CPU is initialized) to the BMC 110 using the UART interface 120. For example, The BMC 110 may display an initial BIOS/UEFI logo, such as a vendor logo, by transmitting a computing instruction to a video controller for displaying the logo.

FIG. 1 also shows system 100 in a state after a handoff operation has occurred. For ease of description, the communication paths between components after the handoff operation are shown in dashed arrow lines. The handoff operations, as used herein, refers to terminating the UART-based early communication and the associated functionality offloading processes. As it will be described in reference to FIG. 2 below, the usage of the UART for BMC/processor communications, and the offloading of tasks from processor 102 which is enabled thereby, only occurs until the PCIe bus 130 is fully trained. In some instances, the offloading of tasks may occur until the bootloader execution phase of the booting process (e.g. UEFI boot device selection phase). In instances, the handoff operation may occur based on other types of buses not described herein. Once the PCIe bus 130 is trained, the system 100 begins normal boot operations and the offloading stops. The BMC 110, computing component 111 and processor 102 begins using the PCIe bus 130 for system communication. In some instances, BMC 110 may continue communicating with data logs 113 database. However, in those instances, the BMC 110 will only store BMC 110 related logs (i.e. regular BMC operations) in the database once the handoff occurs. The UART 120 may still be used for other operations, but within the context of CPU offloading, they are no longer used. During this handoff operation, computing component 111 switches from being in communication with management processor 114 to being connected to PCIe bus 130 through PCIe endpoints 131.

Figure 2:
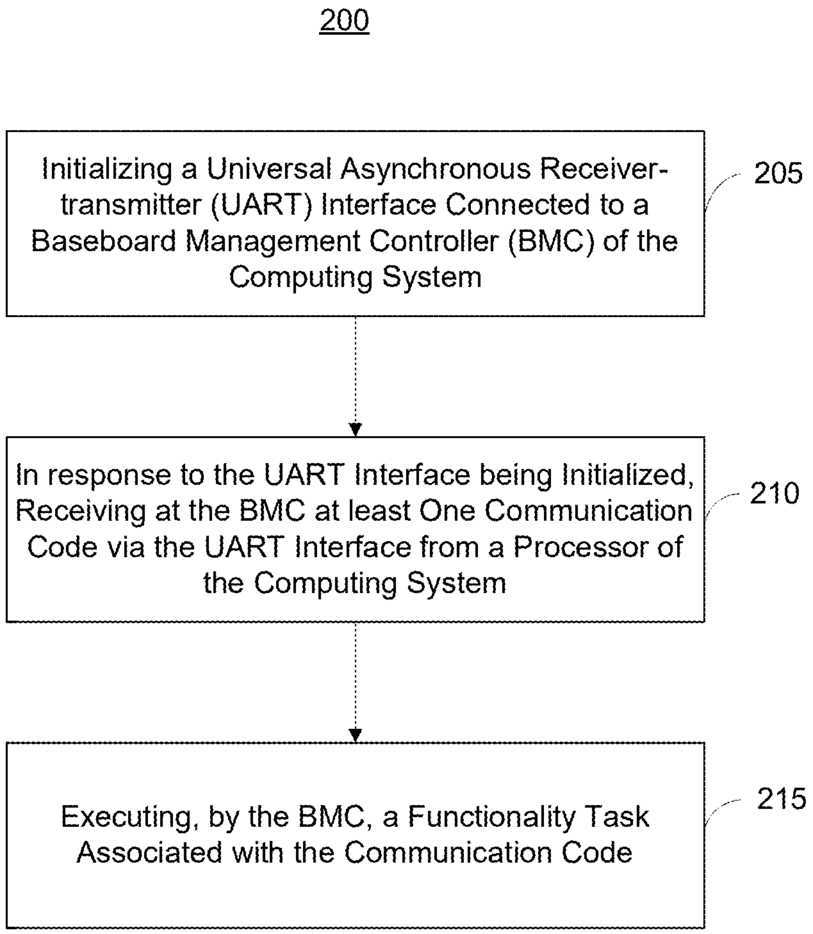
FIG. 2 of a flow diagram showing an illustrative method in accordance with some implementations of the present disclosure.

Now referring to FIG. 2 is a flow diagram of a method 200 for computing system booting is presented. At step 205, method 200 includes initializing a UART interface connected to a BMC of the computing system. UART interface and BMC may include UART interface 120 and BMC 110 described in reference to FIG. 1.

In instances, method 200, at step 210, includes, in response to the UART interface being initialized, receiving at the BMC at least one communication code via the UART interface from a processor of the computing device. In some instances, method 200 may further include transmitting a status request to the processor via the UART interface. In instances, the processor may send the communication code to the BMC via the UART in response to receiving the status request from the BMC via the UART interface. In instances, the processor may include processor 102 described in reference to FIG. 1.

In instances, at step 215, method 200 includes executing, by the BMC, a functionality task associated with the communication code. In some instances, the initializing, receiving and executing steps are performed during a system boot operation prior to a PCIe bus of the computing system being trained. In instances, the method 200 may further include performing a handoff operation in response to the PCIe bus being trained. The PCIe bus may include the PCIe bus 130 described in reference to FIG. 1.

In some instances, executing the functionality task may include generating and transmitting to at least one computing component a components instruction instructing the at least one computing component to perform an action associated with the functionality task. In instances, the functionality task may include displaying video images, where the at least one computing component may include a video controller and the component instruction instructs the video controller to display the video images. In some instances, the video images include an event message and/or an active health system message. The computing component may include computing component 111 described in reference to FIG. 1.

In instances, information corresponding to the functionality task is stored in a dataset in association with the communication code. In instances, the method may further include querying the dataset based on the communication code to determine the functionality task associated with the communication code. In instances, the dataset includes a remoted database. In some instances, the dataset may include a local data store.

In instances, the functionality task includes error logging, where the at least one computing component includes a database storing an error log, and the component instruction instructs the database to log an error associated with the received communication code.

Figure 3:
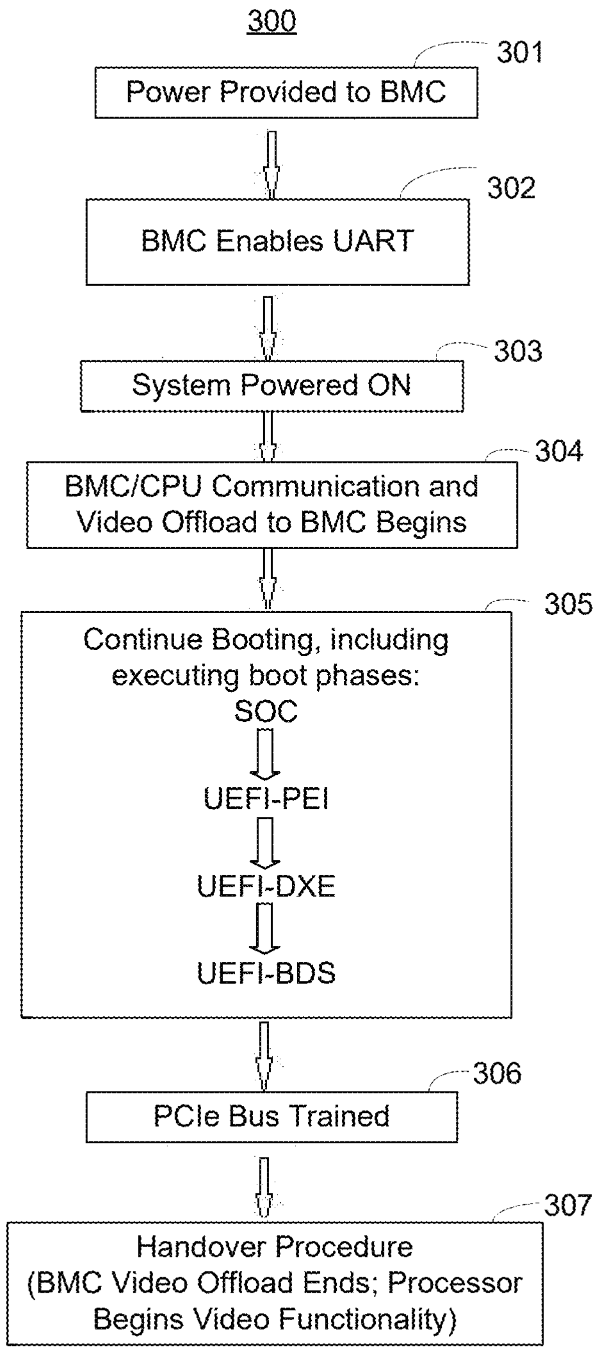
FIG. 3 is an example flowchart showing an order of operations.

Now referring to FIG. 3, an example of a boot sequence is presented which includes offloading of video display functionality to the BMC. In this example sequence 300, at step 301, the offloading process starts by providing power to the BMC, prior to powering ON the entire system. Many systems automatically provide power to the BMC, and the BMCs are configured to be always-on, whenever the system is connected to a power source, even when the processor and remainder of the system is powered OFF. Generally, the power source is connected to the system by a power cable, and accordingly, in this example, step 301 may include a power cable being plugged in or power beginning to be supplied to an already plugged in cable. In other examples, other power sources, such as back-up batteries, may provide power to the BMC, in which case step 301 could include those power sources becoming operational or being connected to the system.

In this example 300, once power is provided to the BMC, the BMC, at step 302, enables host communication through the UART interface. For example, the UART may be initialized for communication at this step. In some instances, the BMC may initialize one UART device of the UART interface, while a CPU may initialize the other UART device at a later phase. In other instances, the BMC may initialize all UART devices of the UART interface.

Continuing on this example 300, at step 303, the sequence includes powering on the system. Powering on in this context may include starting the boot process. It may include physically pressing a power button, remotely booting the system and the like. For example, the BMC may be always-on and capable of sending a turn on signal to the system, such as by an administrator using the BMC to remotely power on the system.

Once the booting signal, the "power on" signal, is sent to the system, at step 304, the BMC and processor begin the early communication and offload processes. In this example, a video functionality offload is provided for the purpose of explaining the sequence. However, in many other examples, as described throughout this disclosure, the offloading step may include other offloaded functionalities, such as logging an event/error in a database. In those examples in which the BMC initialized just its own UART device in step 302, the early offload of video functionality in step 304 may begin with the processor initializing its UART device. Once the processor's UART device is initialized, the early offload of video functionality in step 304 may further include the processor sending communications to the BMC, via the UART interface, providing information to the BMC which the BMC may use to generate video content for display. In this manner, the early communication capability provided by the UART enables the BMC to carry out the video functionality even though the communication pathways that the CPU would ordinarily use for video functionality (e.g., the PCIE bus) have not yet been trained. The BMC may also generate other video content for display based on its own internal programming without reliance on information from the CPU. Once the BMC has determined video content for display (either based on CPU provide information and/or upon its own internal programming), the BMC sends instructions to a video controller of the system to cause the video content to be displayed. In this example, the BMC has a connection with the video controller that is independent from the connection with SOC components.

At step 305, the SOC components are initialized and the pre-boot process begins. The pre-boot process, as used in this disclosure, includes the booting steps prior to the boot loading step. In this example, the pre-boot steps include the UEFI pre-EFI initialization phase (EUFI-PEI), the driver execution environment phase (EUFI-DXE) and the boot device selection phase (UEFI-BDS). In other examples, such as based in BIOS firmware, the process would be similar as it would start at SOC initialization and end at the boot loader phase. In some instances, at step 305, one or more SOC components may send at least one instruction to the BMC. It should be noted that steps 304 and 305 could also occur virtually simultaneously or step 304 (i.e. begin of offload) could begin after step 305 has already started.

At some point in the boot process, during or after step 305, the PCIe bus will be trained and ready for use (step 306). After this point, the processor will have a usable communication path to the video controller and thus the processor will be able to communicate with a video controller. Thus, there will no longer be a need for the BMC to perform this functionality on behalf of the processor. Accordingly, upon or after the PCIe bus being trained (step 306), the BMC and processor may execute a handoff procedure in step 307. The handoff procedure of step 307 comprises the BMC ceasing to provide the video functionality and the processor (specifically, the UEFI code running on the processor) beginning to take over the video functionality. These things (the ceasing of BMC video and the begin of processor video) may occur simultaneously or in sequence. In addition to ending the early video offload, at this stage in the boot process there may no longer be any need for the BMC and the processor to communicate over the UART interface, as they are now able to communicate in the usual fashion via the PCIe bus. Thus, the handover procedure of step 307 may also include ceasing communications over the UART interface. Additionally, if other functionalities were being offloaded to the BMC via the UART interface, step 307 may also include the BMC ceasing to perform these functionalities and the processor taking them on.

In some cases, the PCIe bus will be trained (i.e., step 306 is performed) around the time that the boot device selection step runs, but the precise timing may vary from one implementation to another depending on the particular SOC's boot procedures, and may occur anywhere within step 305 or after step 305. Thus in FIG. 3, steps 306 and 307 are shown occurring after the UEFI-BDS stage of step 305, but this is just one example and it should be understood that steps 306 and/or 307 could occur at other timings. One of the advantages of the disclosed systems and techniques is that communication between the BMC and the CPU, and the execution of functionalities reliant upon such communication, such as video display, may begin far earlier in the booting process. As such, once the system reaches the stage where the operating system is being loaded, the disclosure approach is no longer necessary. As such, the BMC hands off the offloaded functionalities and the system continues with its normal operation. The BMC may continue to perform regular operations, such as system monitoring, but the operations from this point will continue using the PCIe bus. As noted further above, PCIe bus is used only for description purposes, and other bus architectures may be included. In examples, UART interface may be used as a backup communication interface if the PCIe bus becomes temporarily inoperable. For example, an operating system may temporarily disable the root port connected to the PCIe bus or endpoint devices located in an PCI endpoint for configuration or initialization purposes.

Figure 4:
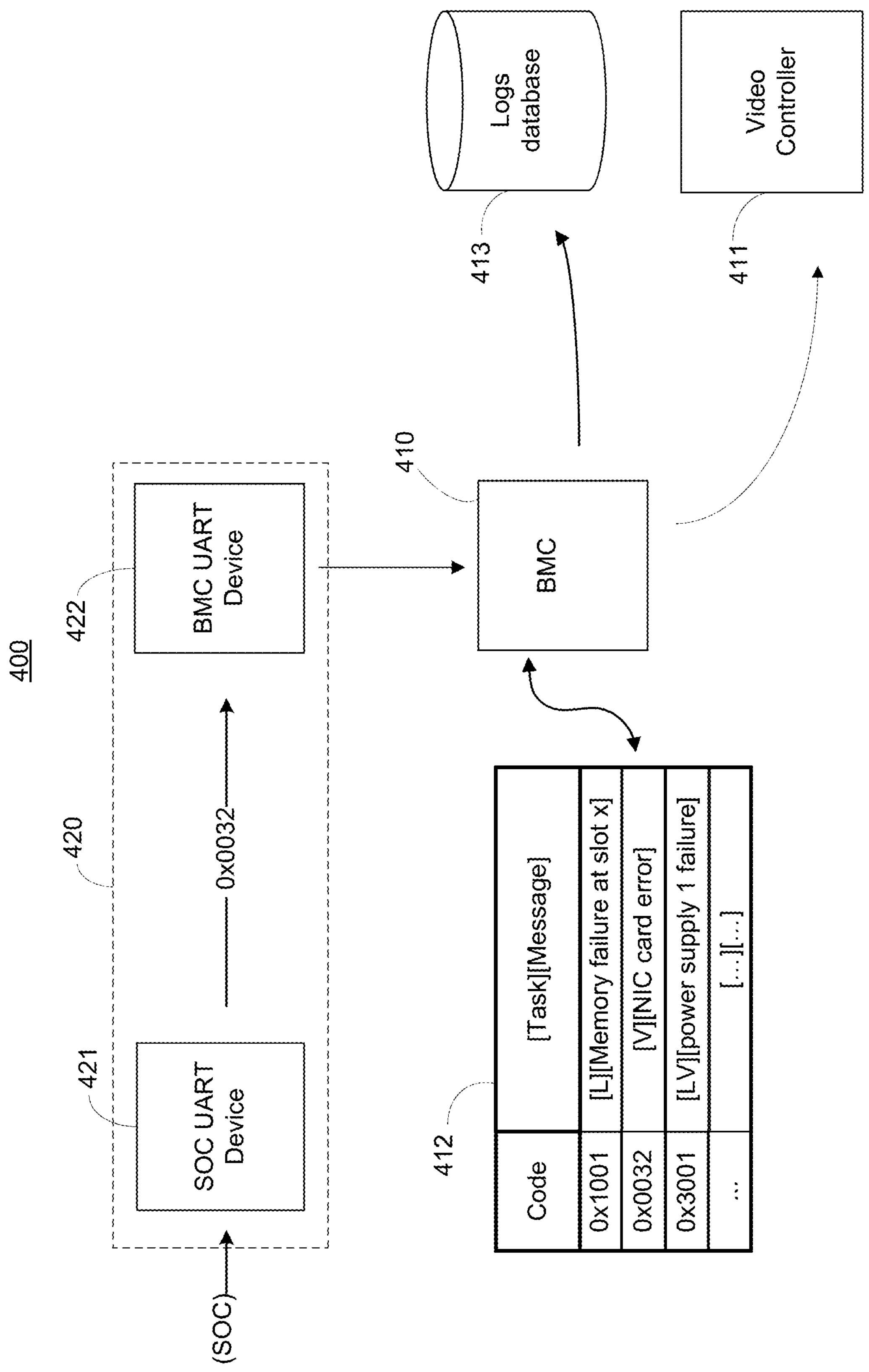
FIG. 4 is a diagram of an example functionality look-up function.

Now referring to FIG. 4, an example functionality look-up process 400 is presented. It should be noted that these operations and command codes are provided only as examples for ease of description. This example includes a SOC UART device 421 and a BMC UART device 422. SOC and BMC UART devices 421/422 are examples of UART devices 120_1 and 120_2 described in reference to FIG. 1. This example also includes BMC 410, video controller 411, lookup table 412 and logs database 413, which are examples of, respectively, BMC 110, computing component 111, lookup table 112 and data logs 113.

As is known in the field, each UART device transmits the data in a series. In this example, the BMC 410 may receive a command code with an ASCII character corresponding to an event during boot. In reference to FIG. 4, the code "0x0032" is provided only as an example for ease of description. Furthermore, although this example only shows the offload and lookup process within the context of one code, it should be noted that this process would occur for multiple codes throughout the boot process, until the handoff operation occurs.

Once the UARTs are initialized and the boot process has begun, the BMC 410 starts to receive communication codes from the processor over the UART interface. As mentioned above, this example only shows the operations in the context of one error code ("0x0032"). In this example, the SOC (not shown) transmits the error code via the SOC UART device 421 and the error code is received by the BMC UART device 422, which in turn sends the code to the BMC 410.

In instances, the BMC 410 may contain instructions (i.e. a nonvolatile memory connected to the BMC) with the codes of interest and an action table. For example, the BMC 410 may access instructions with the set of codes that are to be looked up. In this example, the BMC 410 includes instructions to lookup the code "0x0032." After receiving the code that is included within its instructions, the BMC 410 queries a lookup table 412 dataset for instructions related to that code. In this simplified example, the BMC queries for the code "0x0032", which contains a task and message associated with the code. As mentioned above, the combination of the task and message are part of a functionality task. In some instances, the codes of interest and action table may be located in a dataset, such as a database. The data set may be remote. The data set may be local to the system.

In FIG. 4, the tasks are narrowly represented only as "V" for video and "L" for logging. It should be noted that the tasks could also include additional types of tasks not shown FIG. 4. Once the BMC 410 queries the lookup table 412, which in this example includes a task of "V" for video and a "NIC card error" message, the BMC 410 decodes the instructions and executes the functionality task. In this example, "V" refers to the task of transmitting a computing instruction to video controller 411 to display a message and "NIC card error" refers to the message to be displayed.

If other codes were received, such as if the error code was "0x3001," the BMC 410 would lookup that code in the lookup table 412 for its associated functionality task. In this example, if the code was "0x3001" the BMC 410 would decode the functionality task of "LV" with message "power supply 1 failure." In this example, the functionality task would include the tasks of displaying the error message, as described above, and also storing the error message in a logs database 413. The logged message would likely include other information, such as timestamps, which are not described herein.

Figure 5:
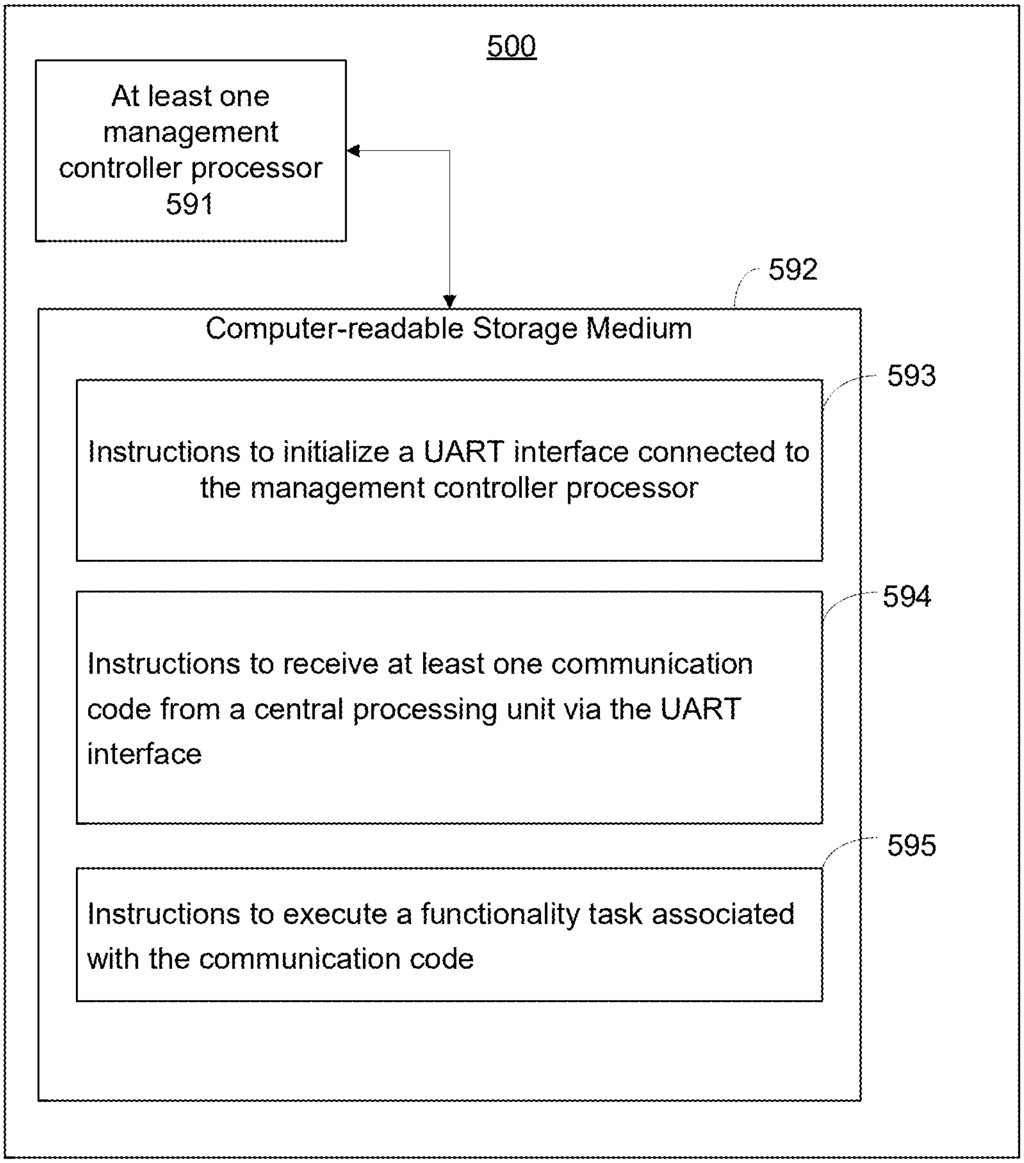
FIG. 5 is a block diagram illustrating an example computing system.

Now referring to FIG. 5, an example computing device 500 is presented. In this example, computing device 500 includes at least one management controller processor 591. The at least one management controller 591 may include a microprocessor, microcontroller, BMC processors, such as ARM-based and MIPS-based processors, and/or any other hardware device suitable for retrieval and execution of instructions from computer-readable storage medium 592. In instances, the at least one management controller processor 591 may include electronic circuitry for performing instructions described in this disclosure.

In instances, computer-readable storage medium 592 may be any medium suitable for storing executable instructions. In examples, without limitation, computer-readable storage medium 592 may include RAM, ROM, EEPROM, HHD, SSD, optical disc, and the like. Computer-readable medium storage 592 may be disposed within computing device 500. In some instances, computer-readable storage medium 592 may external, and communicably connected, to computing device 500. The instruction stored on computer-readable storage medium may be used to implement method described in reference to FIG. 2.

Continuing to refer to FIG. 5, in this example computer-readable storage medium 592 is encoded with set of instructions 593-595. In instances, executable instructions included in each block may be included in different blocks shown and blocks not shown.

In instances, instruction 593, when executed by at least one management controller processor 591, configures the at least one management controller processor 591 to initialize a UART interface connected to the management controller processor 591. In some instances, UART interface is initialized by both the management controller processor and a CPU.

In some instances, instruction 594 further configures management controller processor 591 to, after the UART interface being initialized, receive at least one communication code from a CPU via the UART interface.

In instances, the instruction 595 further configures the at least one management controller processor 591 to, in response to receiving the communication code, execute a functionality task associated with the communication code. In some instances, the at least one management controller processor 591 may be configured to query a lookup table for the functionality task associated with the communication code.

In some instances, the at least one management controller processor 591 may further execute instructions to transmit a component instruction based on the functionality task associated with the communication code to a computing component. In some instances, the at least one management controller processor 591 may transmit the component instruction to a database for log storage, where the component instruction instructs the database to log the message associated with the communication code. In some instances, the at least one management controller processor 591 may transmit the component instruction to a video controller configuring the controller to display the message associated with the communication code.

In some instances, the at least one management controller processor 591 may further execute instructions to perform a handoff operation based on a PCIe bus being trained.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A method for computing system booting, the method comprising:

prior to a PCIe bus of the computing system being trained:

initializing a universal asynchronous receiver transmitter (UART) interface connected to a baseboard management controller (BMC) of the computing system;

in response to the UART interface being initialized, transmitting, by the BMC, a status request to a processor of the computing system via the UART interface;

receiving at the BMC at least one communication code via the UART interface from the processor based on the status request to facilitate execution of a functionality task associated with the communication code prior to the training of PCIe; wherein the functionality task is among a plurality of functionality tasks comprises displaying video images including initial vendor logo and logging boot information including status code and error message generated by BIOS/UEFI during a Power-on Self-test (POST) operation; and querying a dataset based on the communication code to determine the functionality task associated with the communication code, wherein the dataset stores information corresponding to functionality tasks in association with communication codes; and executing, by the BMC, the determined functionality task by generating and transmitting a component instruction corresponding to the determined functionality task to at least one computing component, wherein the determined functionality task comprises one of:

displaying video images, wherein the at least one computing component comprises a video controller and the component instruction instructs the video controller to display the video images; or error logging, wherein the at least one computing component comprises a database storing an error log, and the component instruction instructs the database to log an error associated with the received communication code.

2. The method of claim 1, wherein the determined functionality task comprises displaying video images and the video images comprise an event message and/or an active health system message.

3. The method of claim 1, wherein the initializing, the receiving, and the executing are performed during a system boot operation prior to the PCIe bus of the computing system being trained.

4. The method of claim 1, wherein the processor sends the communication code to the BMC via the UART in response to receiving the status request from the BMC via the UART.

5. The method of claim 1, wherein the dataset is a remote database.

6. The method of claim 1, wherein the dataset is a local data store.

7. The method of claim 1, further comprising performing a handoff operation in response to a PCIe bus being trained.

8. The method of claim 1, wherein the dataset comprises a lookup table that stores the information corresponding to the functionality tasks associated with the communication codes.

9. The method of claim 8, wherein the information corresponding to the functionality tasks comprises, for at least the determined functionality task, an identification of the functionality task and a message associated with the communication code.

10. The method of claim 1, wherein the communication code is associated in the dataset with both the functionality task and a second functionality task, and wherein the information corresponding to the functionality task and the information corresponding to the second functionality task both comprise a message describing the communication code, and wherein:

executing the functionality task comprises generating and transmitting component instructions to the video controller to display video images comprising the message, and executing the second functionality task comprises generating and transmitting component instructions to the database to log the message describing the communication code.

11. A computing system, comprising:

a system board comprising at least one computing component and a processor;

a baseboard management controller (BMC) communicatively connected to the processor; and a universal asynchronous receiver-transmitter (UART) interface communicably connecting the processor to the BMC, wherein the BMC is configured to, prior to a PCIe bus of the computing system being trained:

initialize at least one UART device of the UART interface;

transmit a status request to the processor via the UART interface;

receiving at the BMC at least one communication code via the UART interface from the processor based on the status request to facilitate execution of a functionality task associated with the communication code prior to the training of PCIe; wherein the functionality task is among a plurality of functionality tasks comprises displaying video images including initial vendor logo and logging boot information including status code and error message generated by BIOS/UEFI during a Power-on Self-test (POST) operation; and query a dataset based on the communication code to determine a functionality task associated with the communication code, wherein the dataset stores information corresponding to functionality tasks in association with communication codes; and execute the determined functionality task by generating and transmitting a component instruction corresponding to the determined functionality task to the at least one computing component, wherein the determined functionality task comprises one of:

displaying video images, wherein the at least one computing component comprises a video controller and the component instruction instructs the video controller to display the video images; or error logging, wherein the at least one computing component comprises a database storing an error log, and the component instruction instructs the database to log an error associated with the received communication code.

12. The computing system of claim 11, wherein the BMC is further configured to perform a handoff operation in response to a PCIe bus being trained.

13. The computing system of claim 11, wherein the dataset comprises a lookup table that stores the information corresponding to the functionality tasks associated with the communication codes.

14. The method of claim 13, wherein the functionality task comprises a task and a message associated with the communication code.

15. The method of claim 11, wherein the communication code is associated in the dataset with both the functionality task and a second functionality task, and wherein the information corresponding to the functionality task and the information corresponding to the second functionality task both comprise a message describing the communication code, and wherein:

executing the functionality task comprises generating and transmitting component instructions to the video controller to display video images comprising the message, and executing the second functionality task comprises generating and transmitting component instructions to the database to log the message describing the communication code.

16. A non-transitory computer-readable medium storing instructions, when executed by at least one management controller processor of a computer system, configuring the at least one management controller processor to, prior to training a PCIe bus of the computer system:

initialize an auxiliary communication interface connected to the at least one management controller processor;

in response to the auxiliary communication interface being initialized, transmit a status request to a central processing unit of the computer system via the auxiliary communication interface;

receiving at the management controller processor at least one communication code via the auxiliary communication interface from the processor based on the status request to facilitate execution of a functionality task associated with the communication code prior to the training of PCIe; wherein the functionality task is among a plurality of functionality tasks comprises displaying video images including initial vendor logo and logging boot information including status code and error message generated by BIOS/UEFI during a Power-on Self-test (POST) operation; and query a dataset based on the communication code to determine a functionality task associated with the communication code, wherein the dataset stores information corresponding to functionality tasks in association with communication codes; and execute the determined functionality task by generating and transmitting a component instruction corresponding to the determined functionality task to at least one computing component, wherein the determined functionality task comprises one of:

displaying video images, wherein the at least one computing component comprises a video controller and the component instruction instructs the video controller to display the video images; or error logging, wherein the at least one computing component comprises a database storing an error log, and the component instruction instructs the database to log an error associated with the received communication code.

17. The management controller processor of claim 16, wherein executing the functionality task comprises generating and transmitting to at least one computing component a component instruction instructing the at least one computing component to perform an action associated with the determined functionality task.

18. The management controller processor of claim 16, wherein the at least one management controller processor is further configured to perform a handoff operation in response to the PCIe bus being trained.

19. The method of claim 16, wherein the dataset comprises a lookup table that stores the information corresponding to the functionality tasks associated with the communication codes.

20. The method of claim 16, wherein the communication code is associated in the dataset with both the functionality task and a second functionality task, and wherein the information corresponding to the functionality task and the information corresponding to the second functionality task both comprise a message describing the communication code, and wherein:

executing the functionality task comprises generating and transmitting component instructions to the video controller to display video images comprising the message, and executing the second functionality task comprises generating and transmitting component instructions to the database to log the message describing the communication code.

* * * * *